United States Patent
Hayashi et al.

(10) Patent No.: US 8,089,674 B2
(45) Date of Patent: Jan. 3, 2012

(54) OPTICAL SCANNING APPARATUS, IMAGE FORMING APPARATUS, AND SCANNING-LINE-CHANGE CORRECTING METHOD

(75) Inventors: Eiichi Hayashi, Kanagawa (JP); Takamichi Ohhashi, Kanagawa (JP); Shinya Kamiura, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 892 days.

(21) Appl. No.: 11/683,743

(22) Filed: Mar. 8, 2007

(65) Prior Publication Data

US 2007/0216983 A1    Sep. 20, 2007

(30) Foreign Application Priority Data

Mar. 17, 2006   (JP) ................... 2006-074828

(51) Int. Cl.
*G02B 26/08* (2006.01)
(52) U.S. Cl. ................... 359/205.1; 359/204.1
(58) Field of Classification Search .... 359/204.1–204.5, 359/205.1–206.1; 347/232–233, 244, 258–259
See application file for complete search history.

(56) References Cited

U.S. PATENT DOCUMENTS

| | | | |
|---|---|---|---|
| 2003/0179428 A1* | 9/2003 | Suzuki et al. | 359/204 |
| 2003/0214693 A1* | 11/2003 | Hayashi et al. | 359/204 |
| 2006/0262372 A1 | 11/2006 | Hayashi | |

FOREIGN PATENT DOCUMENTS

| | | |
|---|---|---|
| JP | 4-127115 | 4/1992 |
| JP | 9-292579 | 11/1997 |
| JP | 10-148777 | 6/1998 |
| JP | 11-125784 | 5/1999 |
| JP | 2000-187173 | 7/2000 |
| JP | 2001-343603 | 12/2001 |
| JP | 2002-196269 | 7/2002 |
| JP | 2003-5115 | 1/2003 |
| JP | 2003-262813 | 9/2003 |
| JP | 2003-270567 | 9/2003 |
| JP | 2003-279876 | 10/2003 |
| JP | 2004-85969 | 3/2004 |
| JP | 2004-212628 | 7/2004 |
| JP | 2005-182077 | 7/2005 |

OTHER PUBLICATIONS

U.S. Appl. No. 11/837,890, filed Aug. 13, 2007, Kimura, et al.
Japanese Office Action issued Feb. 1, 2011, in Patent Application No. 2006-074828.

* cited by examiner

*Primary Examiner* — James Phan
(74) *Attorney, Agent, or Firm* — Oblon, Spivak, McClelland, Maier & Neustadt, L.L.P.

(57) ABSTRACT

A first plastic lens and a second plastic lens constituting each imaging optical system are arranged on opposite sides of an optical deflector, so that main scanning directions of optical beams scanned by the single optical deflector become substantially parallel to each other, and the first plastic lens and the second plastic lens of at least one of the plurality of (four) imaging optical systems are formed such that secondary components at scanning positions on the (four) surfaces to be scanned are arranged in a same direction, and are molded by a same mold cavity.

21 Claims, 9 Drawing Sheets

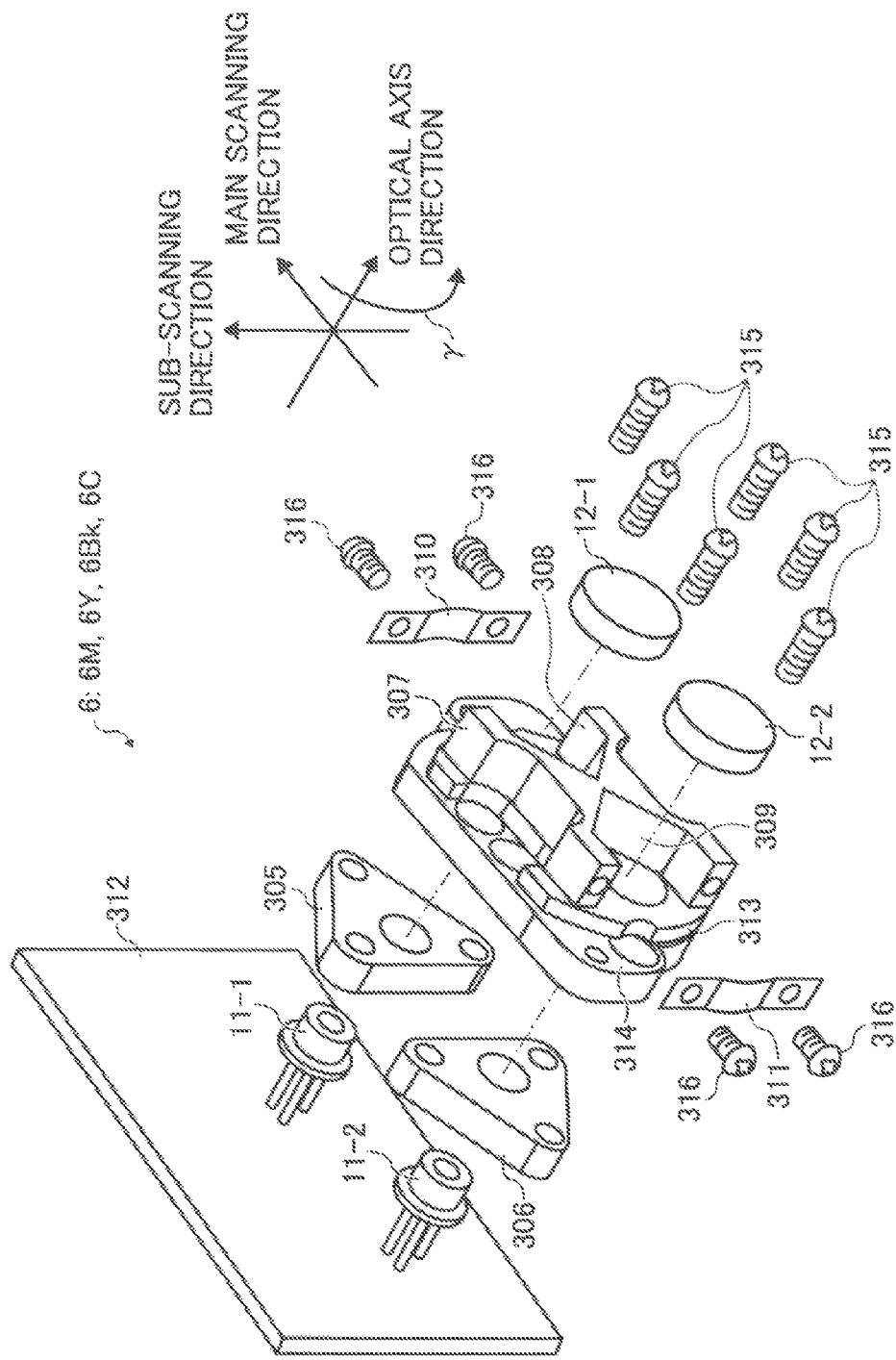

OPTICAL SCANNING APPARATUS, IMAGE FORMING APPARATUS, AND SCANNING-LINE-CHANGE CORRECTING METHOD

CROSS-REFERENCE TO RELATED APPLICATIONS

The present document incorporates by reference the entire contents of Japanese priority document, 2006-074828 filed in Japan on Mar. 17, 2006.

BACKGROUND OF THE INVENTION

1. Field of the Invention

The present invention relates to an image forming apparatus such as a copying machine including a color digital copier, a printer including a multifunction printer (MFP) and a laser printer, a facsimile machine, a plotter, or a multifunction product having these functions, and, more particularly to a multi-color image forming apparatus that forms a color image by superposing toner images of a plurality of colors. The present invention also relates to an optical scanning apparatus used as a writing system in the image forming apparatus, and a scanning-line-change correcting method.

2. Description of the Related Art

In recent years, to correspond to high speed and high image quality of color image forming apparatuses, a digital copier and a laser printer have been in practical use, which simultaneously expose a plurality of optical beams on four photoconductors arranged in a transport direction of output paper, and images developed by a developing device that stores and supplies developers of different colors, that is, yellow, magenta, cyan, and black are sequentially transferred and superposed to form a color image.

Generally, such an image forming apparatus has a plurality of scanning units corresponding to each of the optical beams ("beams"). However, a large space is required for arranging the scanning units, thereby increasing the size of the image forming apparatus. Accordingly, there has been proposed a method in which beams are made to enter a single deflector and scanned, and imaging lenses are arranged in a stacking manner (for example, see Japanese Patent Application Laid-Open No. H4-127115).

Further, to compensate the problem in Japanese Patent Application Laid-Open No. H4-127115, there has been proposed a method in which an imaging unit that makes a plurality of beams enter a single deflector to scan the beams and forms an image on a corresponding photoconductor is provided for each beam, and an optical elements constituting the imaging units are integrally formed by being stacked in layers in a sub-scanning direction (for example, see Japanese Patent Application Laid-Open No. H10-148777). According to the technique disclosed in Japanese Patent Application Laid-Open No. H10-148777, an interval for stacking the optical deflectors can be reduced, or one polygon mirror can function as the optical deflector. Accordingly, load of the motor for rotating the polygon mirror can be reduced, and the apparatus can be made compact.

One major problem in the color image forming apparatus that incorporates the optical scanning apparatus therein is out-of-color registration. That is, in the color image forming apparatus, a plurality of optical beams are simultaneously exposed on four photoconductors arranged in a transport direction of output paper, and images developed by the developing device for different colors (yellow, magenta, cyan, and black) are sequentially transferred and superposed to form a color image. Accordingly, scanning misregistration of the beams on a surface to be scanned of each photoconductor directly appears as out-of-color registration of respective colors.

It has been found that the scanning misregistration, which causes out-of-color registration, is caused mainly by a generatrix curvature of the imaging lens constituting the imaging unit or an imaging optical system (f-theta lens optical system or the like), which images the beams deflected by the optical deflector on the corresponding photoconductor respectively.

Particularly, when the imaging lens is a lens made of plastic ("plastic lens"), outline deformation easily occurs due to its machining characteristic. If the outline deformation occurs in the sub-scanning direction, a generatrix curvature occurs in the same direction, that is, scanning misregistration in the sub-scanning direction occurs on the photoconductor surface.

To avoid the disadvantage, it is necessary to improve the outline accuracy by considerably extending a forming cycle of the plastic lens, or providing a plastic lens position-adjusting mechanism to adjust the outline deformation. This causes a cost increase and complicates the entire apparatus, which is not desirable.

These disadvantages were not considered as problems before, however, they have recently surfaced as problems due to demands for high speed and improvements of image quality in image forming apparatuses.

SUMMARY OF THE INVENTION

It is an object of the present invention to at least partially solve the problems in the conventional technology.

According to an aspect of the present invention, an optical scanning apparatus includes a plurality of imaging optical systems formed of at least one or more plastic lenses, in which optical beams emitted from a plurality of light source units are imaged on a single deflecting unit, and the optical beams deflected by the deflecting unit are imaged and scanned on a plurality of corresponding surfaces to be scanned via the respective imaging optical systems, wherein the at least one or more plastic lenses constituting each imaging optical system are arranged on opposite sides of the deflecting unit, so that main scanning directions of the optical beams scanned by the deflecting unit become substantially parallel to each other, and the at least one or more plastic lenses in the imaging optical systems are formed such that secondary components at scanning positions on the surfaces to be scanned are arranged in a same direction, and are molded by a same mold cavity.

According to another aspect of the present invention, an optical scanning apparatus includes a plurality of imaging optical systems formed of at least two plastic lenses, in which optical beams emitted from a plurality of light source units are imaged on a single deflecting unit, and the optical beams deflected by the deflecting unit are imaged and scanned on a plurality of corresponding surfaces to be scanned via the respective imaging optical systems, wherein a lens arranged closest to the deflecting unit of the at least two plastic lenses constituting the imaging optical system is a common lens corresponding to the surfaces to be scanned, and the at least one or more plastic lenses in the imaging optical systems are formed such that secondary components at scanning positions on the surfaces to be scanned are arranged in a same direction, and are molded by a same mold cavity.

According to still another aspect of the present invention, an optical scanning apparatus includes a plurality of imaging optical systems formed of at least one or more plastic lenses, in which optical beams emitted from a plurality of light source units are imaged on a plurality of deflecting units, and the optical beams deflected by the respective deflecting units are imaged and scanned on a plurality of corresponding surfaces to be scanned via the respective imaging optical systems, wherein the at least one or more plastic lenses in the imaging optical systems are formed such that secondary components at scanning positions on the surfaces to be scanned are arranged in a same direction, and are molded by a same mold cavity.

According to still another aspect of the present invention, an image forming apparatus that forms an electrostatic latent image on a plurality of image carriers by using the above optical scanning apparatus, develops the electrostatic latent image with a color toner different for each image carrier, and sequentially superposes and transfers the toner images formed on respective image carriers onto an intermediate transfer body, and thereafter, batch-transfers the toner images on a sheet-like recording medium, thereby obtaining a color image.

According to still another aspect of the present invention, an image forming apparatus that forms an electrostatic latent image on a plurality of image carriers by using the above optical scanning apparatus, develops the electrostatic latent image with a color toner different for each image carrier, and sequentially superposes and transfers the toner images formed on respective image carriers onto a sheet-like recording medium carried on a transfer body, thereby obtaining a color image.

According to still another aspect of the present invention, a scanning-line-change correcting method for correcting a change in a scanning line, when optical beams emitted from a plurality of light source units are imaged on a single or a plurality of deflecting units, and the optical beams deflected by the deflecting units are imaged and scanned on a plurality of corresponding surfaces to be scanned via an imaging optical system having at least one or more plastic lenses, wherein the at least one or more plastic lenses in the imaging optical systems are formed such that secondary components at scanning positions on the surfaces to be scanned are arranged in a same direction, and the change in the scanning line is corrected by using a plastic lens having a same shape, including use of at least one molded by a same mold cavity, as the at least one or more plastic lenses.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 17 is an exploded perspective view of a laser unit in the optical scanning apparatus shown in FIG. 15.

DETAILED DESCRIPTION OF THE PREFERRED EMBODIMENTS

Figure 1:
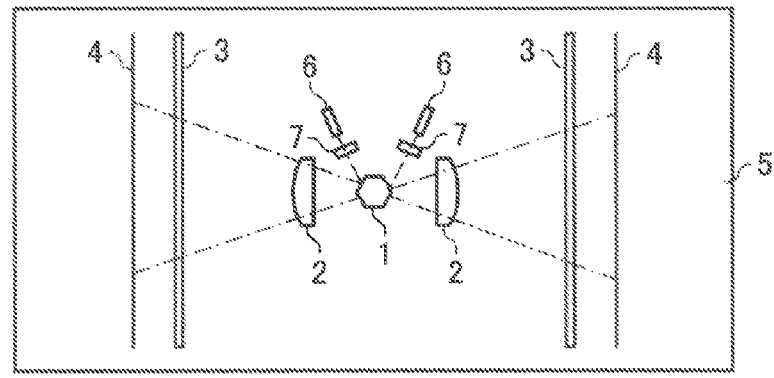
FIG. 1 is a plan view of an optical scanning apparatus according to a first embodiment of the present invention.

Exemplary embodiments of the present invention are explained in detail below with reference to the accompanying drawings. Components such as members and constituent parts having like functions or shapes are denoted by like reference numerals throughout the embodiments, and redundant explanations thereof will be omitted. To simplify the drawings and explanations, components to be shown in the drawings, which need not be particularly explained, can be omitted. When a component(s) in a laid-open patent publication is directly incorporated and explained herein, the reference numeral thereof is put in brackets to discriminate it from reference numerals in the embodiments of the present invention.

The outline of a configuration of a color image forming apparatus 620 that incorporates therein an optical scanning apparatus 600, to which an embodiment described later is applied, is explained with reference to FIGS. 15 and 16. The entire configuration of the color image forming apparatus 620 is explained first with reference to FIG. 16.

The color image forming apparatus 620 includes an intermediate transfer belt 606 as an intermediate transfer body, and respective image forming stations including drum-like photoconductors 4Y, 4M, 4C, and 4Bk as a plurality of image carriers are arranged in parallel along the moving direction of the intermediate transfer belt 606. Hereinafter, when the color is not particularly specified, the four photoconductors 4Y, 4M, 4C, and 4Bk are occasionally simply referred to as "photoconductors 4", for simplifying explanations.

A yellow (Y) toner image is formed in the image forming station having the photoconductor 4Y, a magenta (M) toner image is formed in the image forming station having the photoconductor 4M, a cyan (C) toner image is formed in the image forming station having the photoconductor 4C, and a black (Bk) toner image is formed in the image forming station having the photoconductor 4Bk.

In these four image forming stations, the configurations for forming toner images of respective colors are substantially the same, except that only the color is different. Therefore, the image forming station for forming the yellow toner image is explained as a representative example.

In the image forming station for forming the yellow toner image, a charger 602Y as a charging unit that uniformly charges the surface of the photoconductor 4Y, a developing roller 603Y that allows the charged toner to adhere to an electrostatic latent image formed on the photoconductor 4Y by the optical scanning apparatus 600 so as to manifest an image, a development apparatus 604Y as a developing unit including a toner cartridge for supplying the yellow toner to the developing roller 603Y, a primary transfer roller (not shown) as a primary transfer unit provided on the inner side of the intermediate transfer belt 606 as the intermediate transfer body for primarily transferring the toner image on the photoconductor 4Y onto the intermediate transfer belt 606, and a cleaning apparatus 605Y that scrapes the toner remained on the photoconductor 4Y after the transfer to store the toner are arranged around the photoconductor 4Y. Other image forming stations have the same configuration, and hence explanations thereof will be omitted, by adding an alphabet expressing each color for discrimination. In the explanations below, however, the alphabet expressing each color is not added, and each part is explained as a common configuration.

The latent images are formed simultaneously on the photoconductors 4Y, 4M, 4C, and 4Bk for a plurality of lines (four lines are divided into two in this embodiment), by scanning in opposite scanning directions by an optical deflector 1 including a single polygon mirror.

The intermediate transfer belt 606 is spanned over three rollers 606a, 606b, and 606c and supported, and is rotated and driven in a counterclockwise direction. The respective yellow, magenta, cyan, and black toner images are sequentially transferred onto the intermediate transfer belt 606 with the timing being matched, and superposed to form a color image.

Recording paper 150 as an example of a sheet-like recording medium is fed one by one from the top from a paper feeding tray 607 by a paper feed roller 608, and transmitted to a transfer site by a registration roller pair 609, with the timing being matched with recording start timing in the sub-scanning direction (paper feed direction).

The color image superposed on the intermediate transfer belt 606 is batch-transferred onto the recording paper 150 by a secondary transfer roller 613 as a secondary transfer unit in the transfer site. The recording paper 150 carrying the transferred color image is delivered to a fuser 610 as a fixing unit that includes a fuser roller 610a and a pressure roller 610b, so as to fix the color image thereon. The fixed recording paper 150 is ejected to a paper ejection tray 611 formed on an upper face of the image forming apparatus body by a paper ejection roller pair 612 and stacked.

Figure 15:
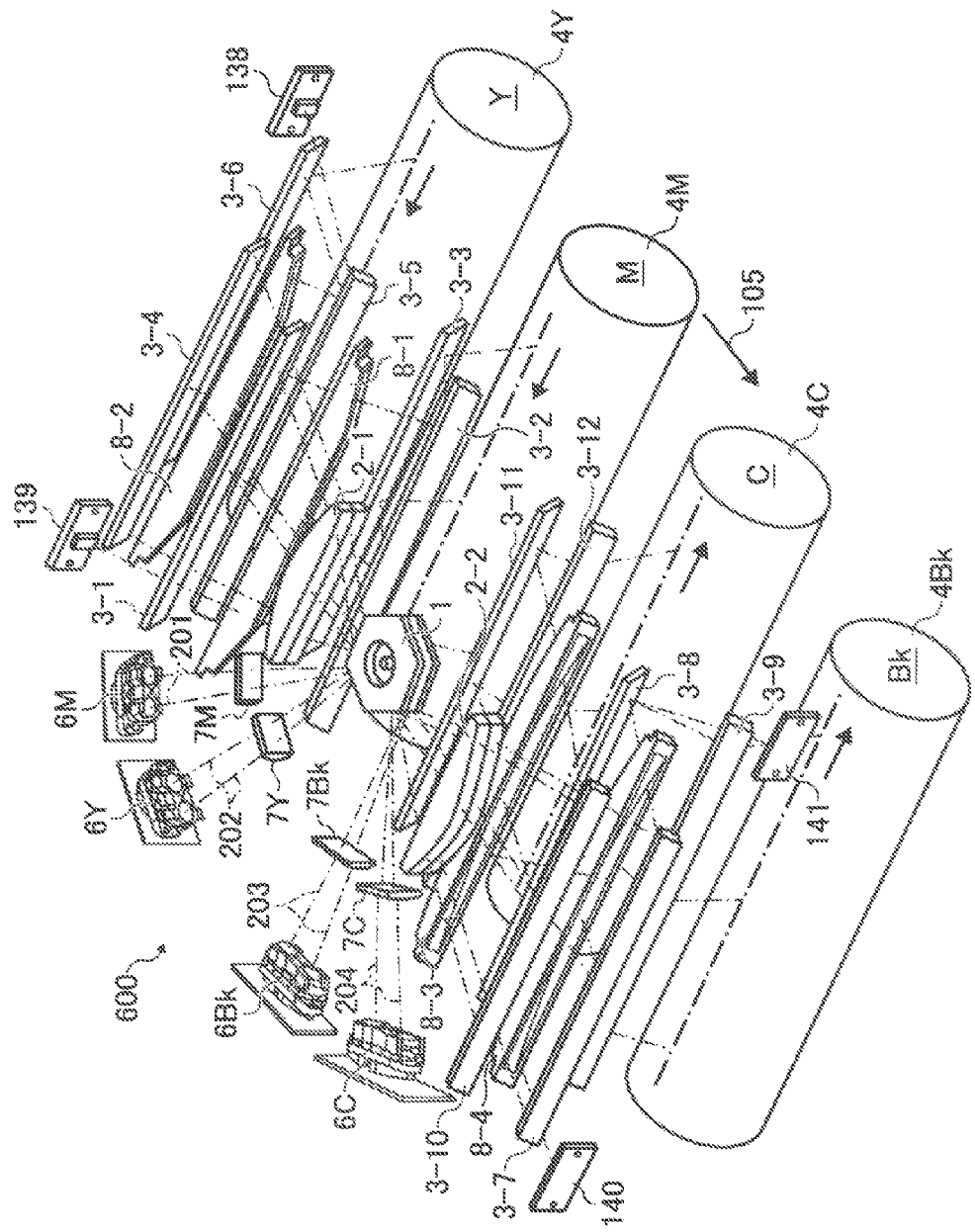
FIG. 15 is a perspective view of a color image forming apparatus that includes the optical scanning apparatus according to the embodiments.

As shown in FIG. 15, the optical scanning apparatus 600 is of an opposite scanning type in which the four stations are divided into two and scanning is performed in the opposite main scanning directions by the optical deflector 1 including a polygon mirror (rotary polygon mirror) as a single polarizing unit.

The four photoconductors 4Y, 4M, 4C, and 4Bk are arranged at equal intervals along a moving direction 105 of the intermediate transfer body, which is not shown in FIG. 15 (see the intermediate transfer belt 606 shown in FIG. 16), and the color image is formed by sequentially transferring and superposing the toner images of the different color.

As shown in FIG. 15, the optical scanning apparatus 600 that scans the respective photoconductors 4Y, 4M, 4C, and 4Bk is integrally formed to scan optical beams ("beams") by the single optical deflector 1. The scanning direction becomes opposite to each other, on opposite sides of the optical deflector 1, and a line image is written such that a write start position on one side and a write end position on the other side match each other.

The optical deflector (polygon mirror) 1 is a hexahedral mirror, and in the present embodiment, is formed in two stages coaxially mounted, and a groove is provided such that an intermediate part that is not used for deflection has a slightly smaller diameter than an inscribed circle of the optical deflector 1, thereby reducing windage losses. The thickness of one layer of the optical deflector 1 is about 2 millimeters. The phases of the upper and lower optical deflectors 1 are the same.

Figure 5:
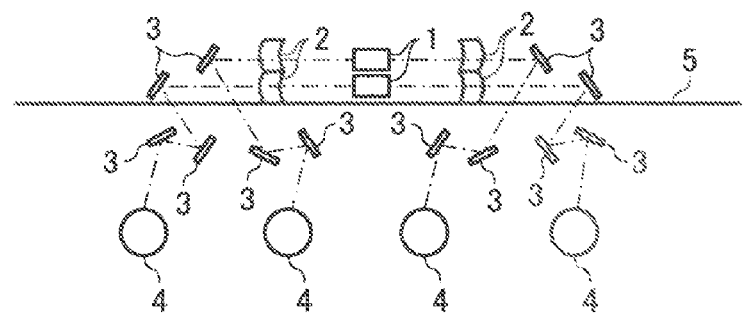
FIG. 5 is a front view of an optical scanning apparatus according to a third embodiment of the present invention.

The height of laser units, that is, laser units 6Y and 6Bk shown in FIG. 15 is adjusted to the lower optical deflector 1, and the height of laser units 6M and 6C shown in FIG. 15 is adjusted to the upper optical deflector 1 so as to change the height thereof, and the laser units are fitted to engagement holes (not shown) formed on a wall of a holding member 5 as a holding unit shown in FIG. 5 (not shown in FIG. 15). A difference in mounting height of the upper and lower laser units 6M and 6Y, 6C and 6Bk, and a height difference between the upper and lower layers of the optical deflector 1 are respectively about 6 millimeters. Hereinafter, the laser units 6M, 6Y, 6C, and 6Bk are occasionally simply referred to as "laser units 6" for simplifying the explanations.

In the present embodiment, in the respective laser units 6, a pair of semiconductor lasers is arranged, and two lines are simultaneously scanned by scanning in the sub-scanning direction with one line pitch being shifted corresponding to recording density. Accordingly, the number of rotation of the optical deflector 1 is decreased to one half relative to the recording speed of the image. Beams 201, 202, 203, and 204 from the respective laser units 6M, 6Y, 6C, and 6Bk enter the optical deflector 1 from opposite directions in a vertical scanning section including an axis of rotation, and are deflected and scanned in both directions. The beams 201, 202, 203, and 204 are shown by the thin solid line in FIGS. 15 and 16, however, in drawings depicting other embodiments described later, to simplify the drawings, reference numerals are not given thereto, and the beams are indicated by a broken line.

One side thereof is explained below along an optical path.

A cylindrical lens 7Y arranged corresponding to the laser unit 6Y has a cylinder surface as a first surface having a curvature only in the sub-scanning direction, and a plane as a second surface. The cylindrical lens 7Y forms an optical face tangle error correction for laser scanning system that makes deflection surfaces of the optical deflector 1 and an outer circumferential face of the drum of the respective photoconductors 4 conjugate in the sub-scanning direction, combined with a toroidal lens, and the beams are linearly converged in the sub-scanning direction by the deflecting surface.

A cylindrical lens 7M arranged corresponding to the laser unit 6M, a cylindrical lens 7C arranged corresponding to the laser unit 6C, and a cylindrical lens 7Bk arranged corresponding to the laser unit 6Bk have the same configuration as that of the cylindrical lens 7Y. The cylindrical lenses 7M, 7Y, 7Bk, and 7C have a function as an imaging unit or an imaging device constituting the imaging optical system in the present invention.

The cylindrical lenses 7M, 7Y, 7C, and 7Bk are occasionally simply referred to as "cylindrical lenses 7" for simplifying the explanations.

An f-theta lens 2-1 has first and second faces of a noncircular arc shape at least in the main scanning direction by plastic (resin) molding, and formed in two stages by impression molding or integral molding by conjugation. An f-theta lens 2-2 has the same configuration as that of the f-theta lens 2-1. The f-theta lenses 2-1 and 2-2 have a function as the imaging unit or the imaging device constituting the imaging optical system that images the respective beams 201, 202, 203, and 204 deflected and scanned by the optical deflector 1 on the surfaces to be scanned of the photoconductors 4Y, 4M, 4C, and 4Bk.

The f-theta lenses 2-1 and 2-2 are made of plastic having light transmission characteristics, which is lightweight and inexpensive. Particularly, because the f-theta lenses 2-1 and 2-2 are made of plastic, the f-theta lenses 2-1 and 2-2 are referred to as "first plastic lenses 2-1 and 2-2". The first plastic lenses 2-1 and 2-2 are occasionally simply referred to as "first plastic lenses 2" for simplifying the explanations.

The beams 202 emitted from the laser unit 6Y enter the lower optical deflector 1 via the cylindrical lens 7Y, are deflected by the lower optical deflector 1, pass through the lower lens of the first plastic lens 2-1, are reflected by a folding mirror 3-4 as a reflecting unit to change the direction to obliquely downward, to enter a toroidal lens 8-2. The beams 202 are then reflected by folding mirrors 3-5 and 3-6 as the reflecting units, to reach the surface to be scanned of the photoconductor 4Y, and imaged in a form of spots, thereby sequentially forming an electrostatic latent image. Accordingly, the first image forming station forms a yellow image.

The laser unit 6M is arranged in the main scanning direction relative to the laser unit 6Y, with a point of intersection between an extended line of the optical axis of the first plastic lens 2-1 and the deflecting surface of the optical deflector (polygon mirror) 1 being shifted radially. The beams 201 emitted from the laser unit 6M have a different incident angle relative to the optical deflector 1 from that of the beams 202, and enter the upper optical deflector 1 via the cylindrical lens 7M.

The beams 201 deflected by the upper optical deflector 1 pass through the upper lens of the first plastic lens 2-1, are reflected by a folding mirror 3-1 as a reflecting unit to change the direction to obliquely downward, to enter a toroidal lens 8-1. The beams 201 are then reflected by folding mirrors 3-2 and 3-3 as the reflecting units, to reach the surface to be scanned of the photoconductor 4M, and imaged in a form of spots, thereby sequentially forming an electrostatic latent image. Accordingly, the second image forming station forms a magenta image.

Optical paths of the optical scanning units from the laser units 6Bk and 6C to the photoconductors 4Bk and 4C are substantially symmetric to the above described paths relative to the optical deflector 1, and hence explanations thereof will be omitted. However, the beams 203 from the laser unit Bk are guided onto the surface to be scanned of the photoconductor 4Bk to form a black image as the fourth image forming station, and the beams 204 from the laser unit C are guided onto the surface to be scanned of the photoconductor 4C to form a cyan image as the third image forming station. The folding mirrors 3-1 to 3-12 are occasionally simply referred to "the folding mirrors 3", for simplifying the explanations.

Toroidal lenses 8-1, 8-2, 8-3, and 8-4 have a function as the imaging unit or the imaging device constituting the imaging optical system that images the respective beams 201, 202, 203, and 204 deflected and scanned by the optical deflector 1 on the surfaces to be scanned of the photoconductors 4Y, 4M, 4C, and 4Bk.

The toroidal lenses 8-1 to 8-4 are made of plastic having light transmission characteristics, which is lightweight and inexpensive. Particularly, because the toroidal lenses 8-1 to 8-4 are made of plastic, the toroidal lenses 8-1 to 8-4 are referred to as "the second plastic lenses 8-1, 8-2, 8-3, and 8-4". The second plastic lenses 8-1 to 8-4 are occasionally simply referred to as "second plastic lenses 8" for simplifying the explanations. In FIG. 16, the second plastic lenses 8-1 to 8-4 are omitted.

Thus, in the respective color stations (image forming stations), a plurality of folding mirrors, in the present embodiment, three each for one station, is arranged such that respective optical path lengths from the deflecting surfaces of the optical deflector 1 to irradiation positions on the photoconductor surfaces as the surfaces to be scanned match a predetermined value, and incident positions and incident angles relative to the respective photoconductors 4Y, 4M, 4C, and 4Bk arranged at equal intervals become the same with each other. Accordingly, the respective beams 201, 202, 203, and 204 enter the photoconductors 4Y, 4M, 4C, and 4Bk at the same angle.

The rotation angle of the photoconductors 4Y, 4M, 4C, and 4Bk between the irradiation positions and the transfer positions (right under) of the respective beams 201, 202, 203, and 204 are the same with each other. The respective second plastic lenses 8-1 to 8-4 are common to each other, with the first surface being a coaxial aspheric surface and the second surface being a toroidal surface. The respective photoconductors 4Y, 4M, 4C, and 4Bk form images with respect to the respective image forming stations corresponding to yellow, magenta, cyan, and black, sequentially.

The configuration of the laser unit as the light source unit is explained with reference to FIG. 17. All the laser units 6M, 6Y, 6Bk, and 6C have the same configuration. Semiconductor lasers 11-1 and 11-2 as the light source unit, and coupling lenses 12-1 and 12-2 are arranged symmetrically in the main scanning direction relative to an ejection axis for each color scanning unit, and the semiconductor lasers 11-1 and 11-2 are press-fitted to respective base members 305 and 306 from the rear side, by fitting the outer circumference of a package. The coupling lenses 12-1 and 12-2 have the same function as that of a collimator lens.

Three screws 315 inserted from the front are screwed to the back of a holder member 307 so as to abut against it and held. The coupling lenses 12-1 and 12-2 are drawn inward by plate springs 310 and 311 and fixed by screws 316, with the outer circumference thereof being made to bump against V grooves 308 and 309 formed so as to expand in a direction opposite to the holder member 307.

At this time, arrangement of the semiconductor lasers 11-1 and 11-2 on an abutting face (a face orthogonal to the optical axis) of the base members 305 and 306 is adjusted so that luminescent points thereof lie on the optical axis of the coupling lenses 12-1 and 12-2, and positions of the coupling lenses 12-1 and 12-2 on the V groove (on the optical axis) are adjusted and fixed so that lights emitted from the coupling lenses 12-1 and 12-2 become parallel beams.

The optical axes of the emitted lights are inclined so as to cross each other relative to an emission axis. In the present embodiment, the inclination of a printed board 312 as a support member is set so that the crossing position is near the reflecting surface of the optical deflector 1.

The printed board 312 having a driving circuit formed thereon is fixed by a screw on a stand arranged in a standing condition on the holder member 307, and a lead terminal of each of the semiconductor lasers 11-1 and 11-2 is inserted into a through hole and soldered, thereby integrally forming the laser units 6M, 6Y, 6Bk, and 6C.

A plurality of semiconductor lasers are used in the respective laser units, however, the semiconductor laser can be only one, or can be a semiconductor laser array in which a plurality of sources of luminescence are formed monolithic in one chip.

As shown in FIG. 15, boards 138 and 140 forming a synchronous detection sensor mounted with a photosensor ("the synchronous detection sensor boards 138 and 140"), and boards 139 and 141 forming an end detection sensor mounted with a photosensor ("the end detection sensor boards 139 and 141") are arranged on a scan start side and a scan end side of an image recording area, so as to detect the beams scanned in the respective image forming stations. The synchronous detection sensor boards 138 and 140 have a function as a light detector that detects the scanned optical beams.

In the present embodiment, the synchronous detection sensor boards 138 and 140 are arranged on an image area start side so as to achieve write start timing based on a detection signal thereof. The end detection sensor boards 139 and 141 are arranged on an image area end side so as to detect the scanning time from the synchronization detection sensor and corrects the write start timing so that there is no shift of a scan area, which is between the optical scanning units facing the optical deflector 1, in the main scanning direction, even if there is a deviation in the magnification due to a fluctuation in a wavelength or a change in a curvature of the first plastic lenses 2-1 and 2-2. That is, in the optical scanning apparatus 600 according to the present embodiment, because the scanning directions are opposite to each other, image areas can extend in opposite directions when a magnification fluctuates, and therefore the timing is corrected so that the centers of images are aligned with each other.

Figure 16:
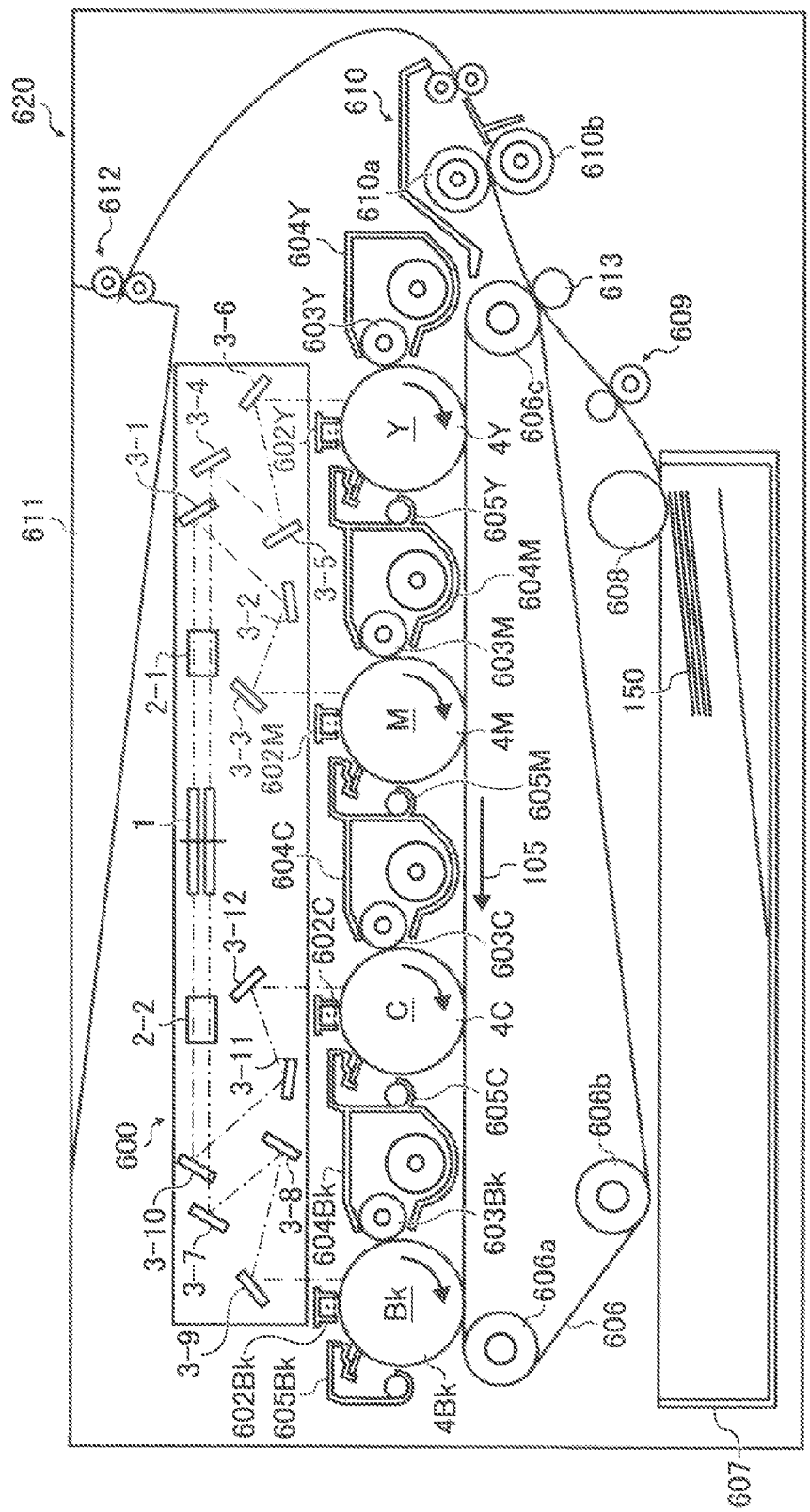
FIG. 16 is a side view of the color image forming apparatus shown in FIG. 15.

In the color image forming apparatus 620 shown in FIGS. 15 and 16, a tandem-type image forming apparatus that transfers images onto the intermediate transfer body and then batch-transfers images to the sheet-like recording medium has been explained. However, in a tandem-type color image forming apparatus adopting a direct transfer method, in which images are sequentially transferred and superposed, while the sheet-like recording medium is carried on an endless belt, the present invention can be applied and executed.

The image carrier is not limited to the drum-like photoconductor, and the present invention can be applied to the color image forming apparatus using an endless belt-form photoconductor including a surface to be scanned and the optical scanning apparatus incorporated in the color image forming apparatus.

Figure 2:
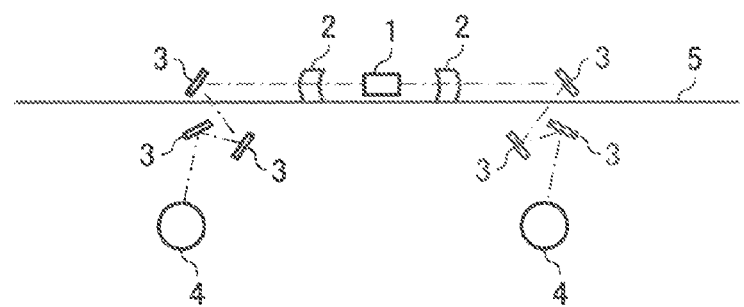
FIG. 2 is a front view of the optical scanning apparatus shown in FIG. 1.

The optical scanning apparatus in the color image forming apparatus according to a first embodiment of the present invention is shown in FIGS. 1 and 2.

To achieve space saving, the optical scanning apparatus shown in FIGS. 1 and 2 mainly includes the two laser units 6 as a plurality of light source units that generate and emit beams shown by the broken line in the drawings, the cylindrical lens 7 arranged corresponding to each of the laser units 6, the optical deflector 1 having a single stage configuration as a single deflecting unit, a plurality of (two in this example) f-theta lens optical systems as an imaging optical system having the at least one or more (one in this example) first plastic lenses 2, the at least one or more (three in this example) folding mirrors 3 arranged on the optical path of each f-theta lens optical system, and the holding member 5 for holding respective optical elements.

Each of the laser units 6 has a semiconductor laser and a collimator lens. The semiconductor laser has a configuration of a multi-semiconductor laser (same in the embodiments described later). The function of the single holding member 5 is the same in the embodiments described later.

In the first embodiment, at least the one or more (one in this example) first plastic lenses 2 constituting each f-theta lens optical system are arranged on the opposite sides of the optical deflector 1, so that the main scanning directions of the beams scanned by the optical deflector 1 become substantially parallel to each other. Further, the at least one or more plastic lenses in the f-theta lens optical systems are formed such that secondary components at scanning positions on the surfaces to be scanned of the two photoconductors 4 are arranged in the same direction, and are molded by the same mold cavity.

In the color image forming apparatus, to correspond to a combination of the f-theta lens optical system and photoconductors forming a pair with the f-theta lens optical system (in this example, each of the photoconductors 4 serves for two colors, for example, Y and M, and C and Bk), a deviation of the scanning position on each of the photoconductors 4 causes out-of-color registration between respective colors. "Formed such that secondary components at scanning positions on the surfaces to be scanned of the two photoconductors 4 are arranged in the same direction" requires to satisfy two conditions, that is, the directions of the four colors are equalized in the optical design (mathematically, the secondary components are extracted), and directions of outline curvatures that affect a scanning line curvature due to each of the first plastic lenses 2 are made the same direction. An example relating to the secondary components at the scanning position will be explained later.

To satisfy the first condition, it is essential to specify the configuration of arrangement (layout) of the folding mirrors 3 in the optical design, that is, to equalize the number of inversions for inverting the beams up and down by the folding mirrors 3 by the respective f-theta lens optical systems. In other words, it is important that the f-theta lens optical system constituting the optical scanning apparatus has the at least one or more folding mirrors 3, and the number of the folding mirrors for folding the beams having passed through the at least one or more first plastic lenses 2 are the same for each of the first plastic lenses 2. In the first embodiment, as shown in FIG. 2, three folding mirrors are arranged for each of the left and right first plastic lenses 2.

To satisfy the second condition, it is essential to use the first plastic lens 2 molded by the same mold cavity. The first plastic lenses 2 molded by the same mold cavity have nearly identical direction or tendency of the outline curvature. Therefore, the scanning line curvature due to the outline curvature of the first plastic lens 2 can be suppressed. The first plastic lens 2 molded by the same mold cavity is not limited to the one molded by the same mold cavity of a multi-cavity mold, and for example, the one molded by the same mold cavity of a single cavity mold is naturally included.

To suppress the outline curvature of the first plastic lens 2, it is desired to use the one manufactured continuously under the same manufacturing condition, in addition to use the one molded by the same mold cavity. That is, it is more preferable that the manufacturing lot is the same. As the same manufacturing condition, at least the material specification and the molding condition need to be the same. Accordingly, when the mold is polished in maintenance service or various process changes are performed, the mold needs to be deleted from the same manufacturing lot.

Further, in the second condition, to assemble the first plastic lenses 2 molded by the same mold cavity, without erroneously mixing up the first plastic lenses 2 with the one molded by another cavity, for example, the mold cavity number is displayed or unevenness is provided on a non-transfer surface of the plastic lens, the number of unevenness and the arrangement thereof are combined, or the non-transfer surface of the plastic lens can be partially colored, so that the first plastic lens 2 can be identified and recognized from outside.

The second condition is also applied to the second plastic lens 8 (see FIGS. 3, 4, 6, and 7) and an integrally-formed first plastic lens 9 (see FIG. 7) constituting the f-theta lens optical system in the embodiments described later, and hence explanations thereof will be omitted in the embodiments described later.

It is a characteristic of the first plastic lens 2 that it has partially a non-transfer surface. As a part of the first plastic lens 2 forming the non-transfer surface, for example, in FIG. 2, a shrinkage pattern can be generated on the upper face excluding an outer peripheral edge of the first plastic lens 2. This is for intentionally generating shrinkage on the upper face excluding the outer peripheral edge of the first plastic lens 2, as an injection molding condition of plastic, thereby improving form accuracy of an important beam passage region and avoiding generation of a curvature. The same thing applies to the second plastic lens 8 (see FIGS. 3, 4, 6, and 7) and the integrally-formed first plastic lens 9 (see FIG. 7) constituting the f-theta lens optical system in the embodiments described later, and hence explanations thereof will be omitted in the embodiments described later.

The operation thereof is explained next. The beams emitted from the respective laser units 6 enter the optical deflector 1 via each of the cylindrical lenses 7 and are imaged thereon, are deflected by the optical deflector 1, and pass through each of the first plastic lenses 2. In the f-theta lens optical systems on the left and right having the same configuration, the beams are then reflected, respectively by the three folding mirrors 3 to reach the surfaces to be scanned of the photoconductors 4, imaged in a form of spots, and scanned in the main scanning direction, thereby sequentially forming an electrostatic latent image.

Therefore, according to the first embodiment, scanning line deviation of the optical scanning apparatus can be prevented without considerably increasing the accuracy of the plastic lens (the first plastic lens 2). Accordingly, a color image forming apparatus that can reduce out-of-color registration can be provided.

Figure 3:
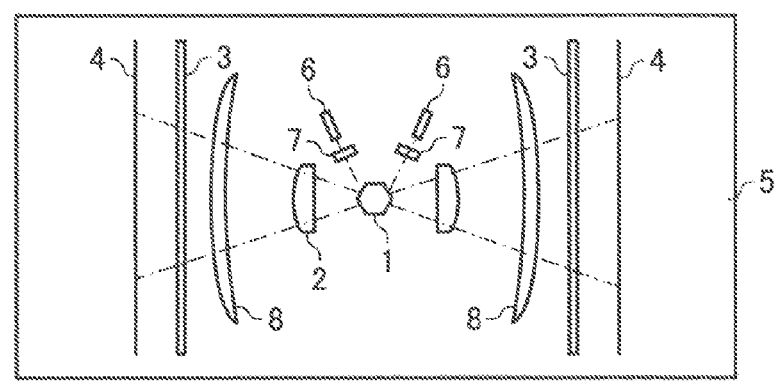
FIG. 3 is a plan view of an optical scanning apparatus according to a second embodiment of the present invention.
Figure 4:
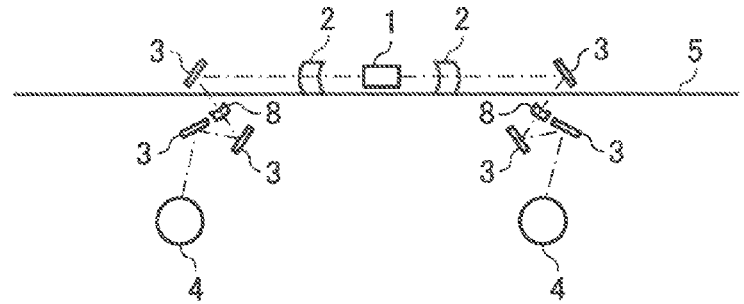
FIG. 4 is a front view of the optical scanning apparatus shown in FIG. 3.

An optical scanning apparatus in a color image forming apparatus according to a second embodiment of the present invention is shown in FIGS. 3 and 4.

The optical scanning apparatus shown in FIGS. 3 and 4 is mainly different from the optical scanning apparatus according to the first embodiment shown in FIGS. 1 and 2 in that the long second plastic lens 8 is respectively arranged outside of the left and right first plastic lenses 2 arranged on the opposite sides of the optical deflector 1. Other configurations are the same as those of the optical scanning apparatus in the color image forming apparatus according to the first embodiment. The features different from the optical scanning apparatus in the color image forming apparatus according to the first embodiment are mainly explained below.

In the second embodiment, the at least one or more (one in this example) second plastic lenses 8 constituting each f-theta lens optical system, as well as the at least one or more (one in this example) first plastic lenses 2 constituting each f-theta lens optical system, are arranged on the opposite sides of the optical deflector 1, so that the main scanning directions of the beams scanned by the optical deflector 1 become substantially parallel to each other. Further, the one second plastic lens 8 in each f-theta lens optical system is formed such that secondary components at scanning positions on the surfaces to be scanned of the two photoconductors 4 are arranged in the same direction, and is molded by the same mold cavity.

Also in the second embodiment, the f-theta lens optical system constituting the optical scanning apparatus has the at least one or more folding mirrors 3 (in this example, three folding mirrors each on the left and right sides), and the number of the folding mirrors for folding the beams having passed through the at least one or more left and right first plastic lenses 2 is two for each of the second plastic lenses 8.

To satisfy the second condition, it is important to use the second plastic lenses 8 molded by the same mold cavity.

In addition, each f-theta lens optical system has at least two first plastic lenses and second plastic lenses, and the combination of the first plastic lens and second plastic lens is specified.

The operation thereof is explained next. The beams emitted from the respective laser units 6 enter the optical deflector 1 via each of the cylindrical lenses 7 and are imaged thereon, are deflected by the optical deflector 1, and pass through each of the first plastic lenses 2. In the f-theta lens optical systems on the left and right having the same configuration, the beams are then reflected, respectively by the one folding mirror 3 obliquely downward, pass through each of the second plastic lenses 8 and reflected by the two folding mirrors 3 on the left and right having the same configuration, to reach the surfaces to be scanned of the photoconductors 4, imaged in a form of spots, and scanned in the main scanning direction, thereby sequentially forming an electrostatic latent image.

Therefore, according to the second embodiment, scanning line deviation of the optical scanning apparatus can be prevented without considerably increasing the accuracy of the plastic lens (the first plastic lens 2 and the second plastic lens 8). Accordingly, a color image forming apparatus that can reduce out-of-color registration can be provided.

An optical scanning apparatus in a color image forming apparatus according to a third embodiment of the present invention is shown in FIG. 5.

The optical scanning apparatus shown in FIG. 5 is mainly different from the optical scanning apparatus according to the first embodiment shown in FIGS. 1 and 2 in that the optical deflector 1 is formed in two upper and lower stages, that the at least one or more (one in this example) first plastic lenses 2 constituting the f-theta lens optical system are laminated in upper and lower two stages in a sub-scanning direction orthogonal to the main scanning direction, and the four photoconductors 4 are arranged corresponding to the four colors. Other configurations are the same as those of the optical scanning apparatus in the color image forming apparatus according to the first embodiment.

Figure 6:
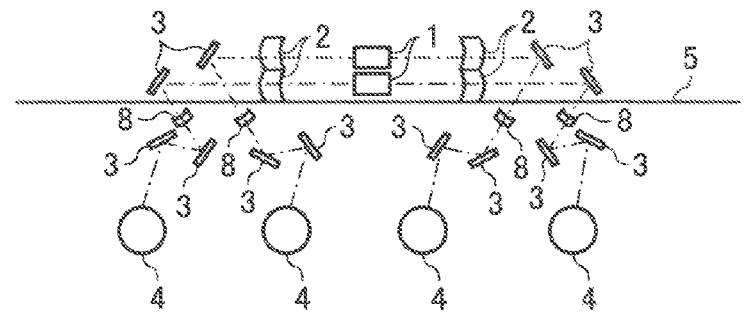
FIG. 6 is a front view of a modified example of the optical scanning apparatus according to the third embodiment.

FIG. 6 depicts a modified example of the third embodiment. The optical scanning apparatus in the color image forming apparatus shown in FIG. 6 is mainly different from the optical scanning apparatus in the color image forming apparatus according to the third embodiment shown in FIG. 5 in that the second plastic lens 8 is provided between the first and second folding mirrors 3 constituting the four f-theta lens optical systems, and the number of the folding mirrors 3 for folding the beams having passed through at least the one or more second plastic lenses 8 is two, respectively, for each of the second plastic lenses 8. Other configurations are the same as those of the optical scanning apparatus in the color image forming apparatus according to the third embodiment.

The optical scanning apparatus in the color image forming apparatus shown in FIG. 6 has the same configuration as that of the optical scanning apparatus 600 shown in FIGS. 15 and 16 (in these drawings, the second plastic lens 8 is omitted).

According to the optical scanning apparatus shown in FIGS. 5 and 6, the electrostatic latent image can be formed on the four photoconductors 4 at twice the speed, in other words, in half the scanning time, of the optical scanning apparatus shown in FIGS. 1 to 4. In addition, it is needless to mention that the fundamental advantages and effects of the first and second embodiments can be obtained in the third embodiment.

Figure 7:
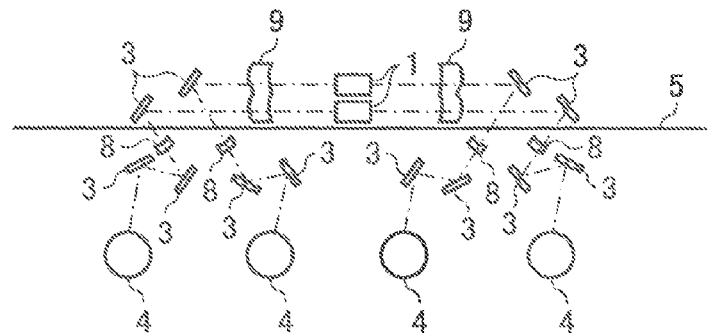
FIG. 7 is a front view of an optical scanning apparatus according to a fourth embodiment of the present invention.

FIG. 7 depicts an optical scanning apparatus in a color image forming apparatus according to a fourth embodiment of the present invention.

The optical scanning apparatus shown in FIG. 7 is different from the optical scanning apparatus according to the third embodiment shown in FIG. 6 in that the integrally-formed first plastic lens 9 in which the at least one or more (one in this example) first plastic lenses 2 constituting the f-theta lens optical system are integrally formed in the sub-scanning direction orthogonal to the main scanning direction is used instead of the first plastic lens 2 laminated in upper and lower two stages. Other configurations are the same as those of the optical scanning apparatus shown in FIG. 6.

Figure 8:
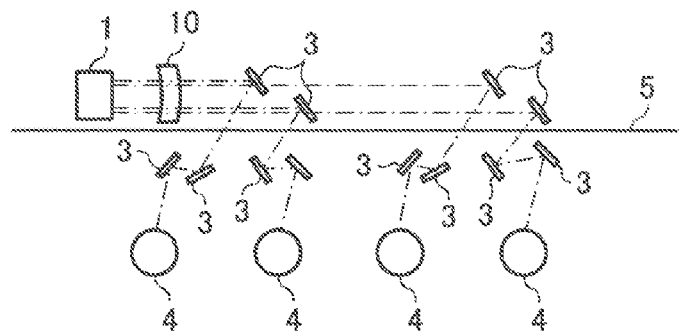
FIG. 8 is a front view of an optical scanning apparatus according to a fifth embodiment of the present invention.

FIG. 8 depicts an optical scanning apparatus in a color image forming apparatus according to a fifth embodiment of the present invention.

The optical scanning apparatus in the color image forming apparatus shown in FIG. 8 includes a plurality of (four in this example) f-theta lens optical systems formed of at least two first plastic lenses (not shown), in which beams emitted from a plurality of laser units (not shown) having a semiconductor laser and a collimator lens are imaged on the single optical deflector 1 via the cylindrical lens 7, and the beams deflected by the optical deflector 1 are imaged and scanned on a plurality of (four in this example) corresponding surfaces to be scanned of the photoconductors 4. In the optical scanning apparatus, a lens arranged closest to the optical deflector 1 of the two plastic lenses constituting the f-theta lens optical system as the imaging optical system is a common lens 10 made of plastic, corresponding to a plurality of (four in this example) the photoconductors 4, and at least one or more plastic lenses constituting the f-theta lens optical system are formed such that secondary components at scanning positions on the surfaces to be scanned of the photoconductors 4 are arranged in the same direction, and is molded by the same mold cavity.

Due to this configuration, according to the fifth embodiment, scanning line deviation of the optical scanning apparatus can be prevented without considerably increasing the accuracy of the plastic lens, that is, a color image forming apparatus that can reduce out-of-color registration can be provided.

Figure 9:
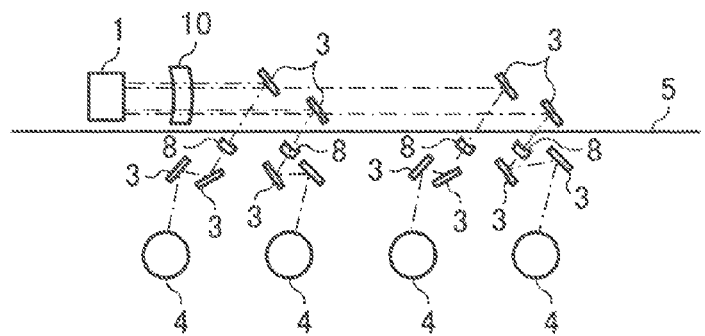
FIG. 9 is a front view of an optical scanning apparatus according to a sixth embodiment of the present invention.

FIG. 9 depicts an optical scanning apparatus in a color image forming apparatus according to a sixth embodiment of the present invention.

The optical scanning apparatus shown in FIG. 9 is mainly different from the optical scanning apparatus in the color image forming apparatus according to the fifth embodiment shown in FIG. 8 in that the second plastic lens 8 is provided between the first and the second folding mirrors 3 constituting each f-theta lens optical system, and the number of the folding mirrors 3 for folding the beams having passed through the at least one or more second plastic lenses 8 is two, respectively, for each of the second plastic lenses 8.

In addition, each f-theta lens optical system has at least two plastic lenses (the common lens 10 and the second plastic lens 8), and the combination of the common lens 10 and the second plastic lens 8 is specified.

Due to this configuration, according to the sixth embodiment, scanning line deviation of the optical scanning apparatus can be prevented without considerably increasing the accuracy of the plastic lens, that is, a color image forming apparatus that can reduce out-of-color registration can be provided.

Figure 10:
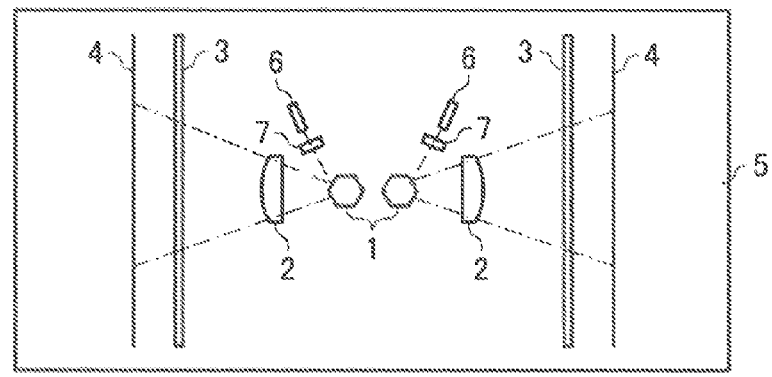
FIG. 10 is a front view of an optical scanning apparatus according to a seventh embodiment of the present invention.
Figure 11:
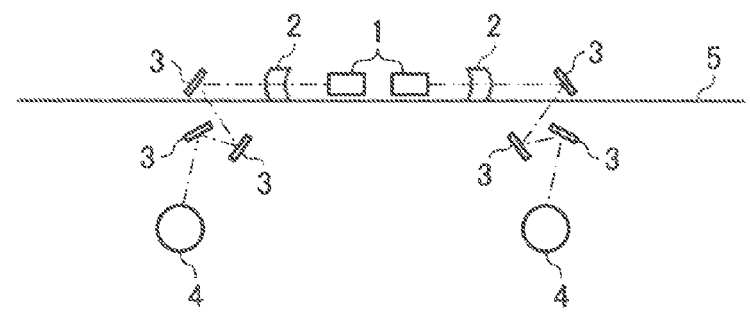
FIG. 11 is a front view of the optical scanning apparatus shown in FIG. 10.

FIGS. 10 and 11 depict an optical scanning apparatus in a color image forming apparatus according to a seventh embodiment of the present invention.

To achieve space saving, the optical scanning apparatus in the color image forming apparatus shown in FIGS. 10 and 11 includes a plurality of (two in this example) f-theta lens optical systems formed of the at least one or more first plastic lenses 2, in which beams emitted from a plurality of (two in this example) laser units are imaged on a plurality of (two in this example) the optical deflectors 1 via the cylindrical lens 7, and the beams deflected by the respective optical deflectors 1 are imaged and scanned on corresponding surfaces to be scanned of a plurality of (two in this example) the photoconductors 4 via the respective f-theta lens optical systems. In the optical scanning apparatus in the color image forming apparatus, at least one or more first plastic lenses in each f-theta lens optical system are formed such that secondary components at scanning positions on the photoconductors 4 are arranged in the same direction, and is molded by the same mold cavity.

According to the seventh embodiment, scanning line deviation of the optical scanning apparatus can be prevented without considerably increasing the accuracy of the plastic lens, that is, a color image forming apparatus that can reduce out-of-color registration can be provided.

Figure 12:
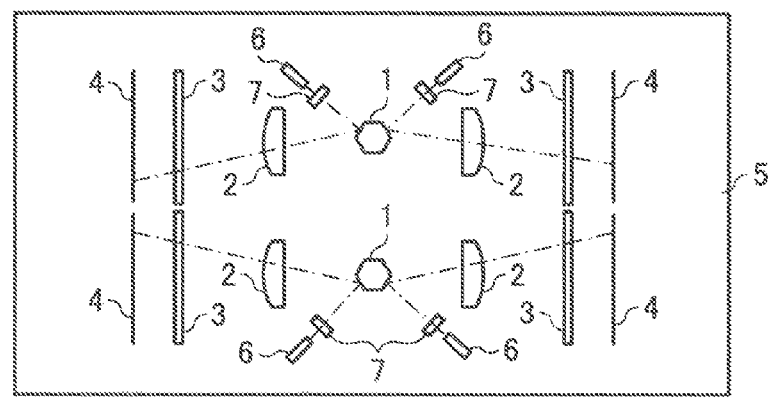
FIG. 12 is a plan view of an optical scanning apparatus according to an eighth embodiment of the present invention.

FIG. 12 depicts an optical scanning apparatus in a color image forming apparatus according to an eighth embodiment of the present invention.

The optical scanning apparatus shown in FIG. 12 is mainly different from the optical scanning apparatus in the color image forming apparatus according to the seventh embodiment shown in FIGS. 10 and 11 in that the f-theta lens optical system has the at least one or more folding mirrors 3, and the number of the folding mirrors 3 that fold back the beams having passed through at least one or more first plastic lenses is the same for each first plastic lens. Further, at least one or more first plastic lenses constituting each f-theta lens optical system are laminated in the sub-scanning direction. Each f-theta lens optical system has the at least two first plastic lenses 2, and the combination of two cavities is defined.

Figure 14:
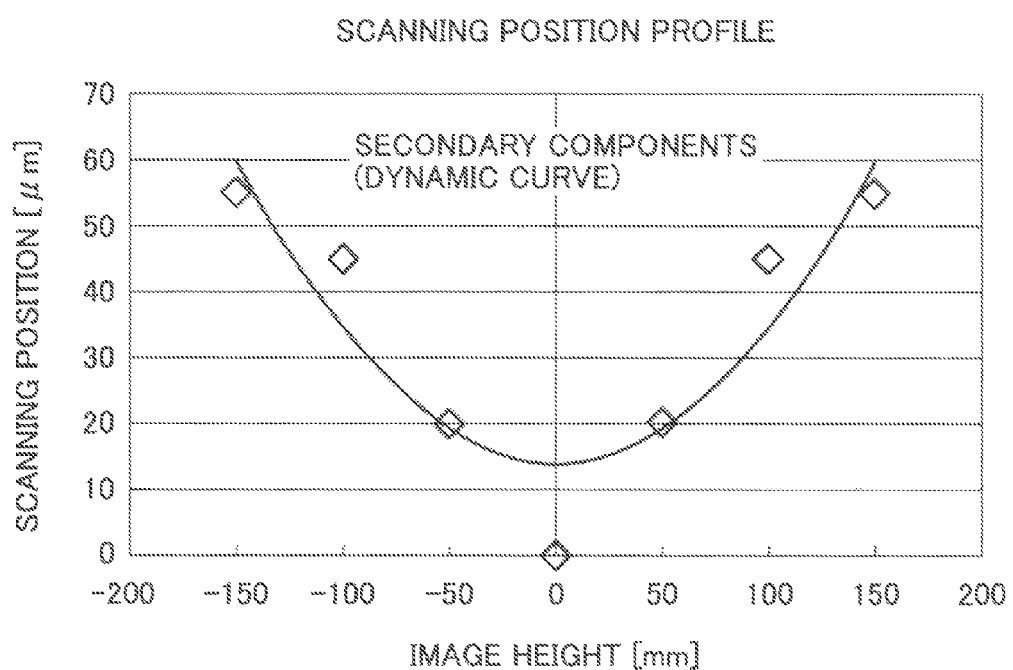
FIG. 14 is a graph of a scanning line curvature when optical design is made such that secondary components are different from each other according to the conventional technique.

In FIG. 14, secondary components at the scanning positions on the surfaces to be scanned of the photoconductors are extracted and approximated, for the first plastic lens (scanning lens) as an example. The distance, ±150 millimeters (corresponding to A3 paper size), is plotted on X axis, in the left and right directions, designating the center of the outer periphery of the photoconductor in the direction of the rotation axis as image height "0", and deviation amount of the scanning position is plotted on Y axis, thereby extracting and plotting the scanning line curvature as the secondary components (quadratic curve).

Figure 13A:
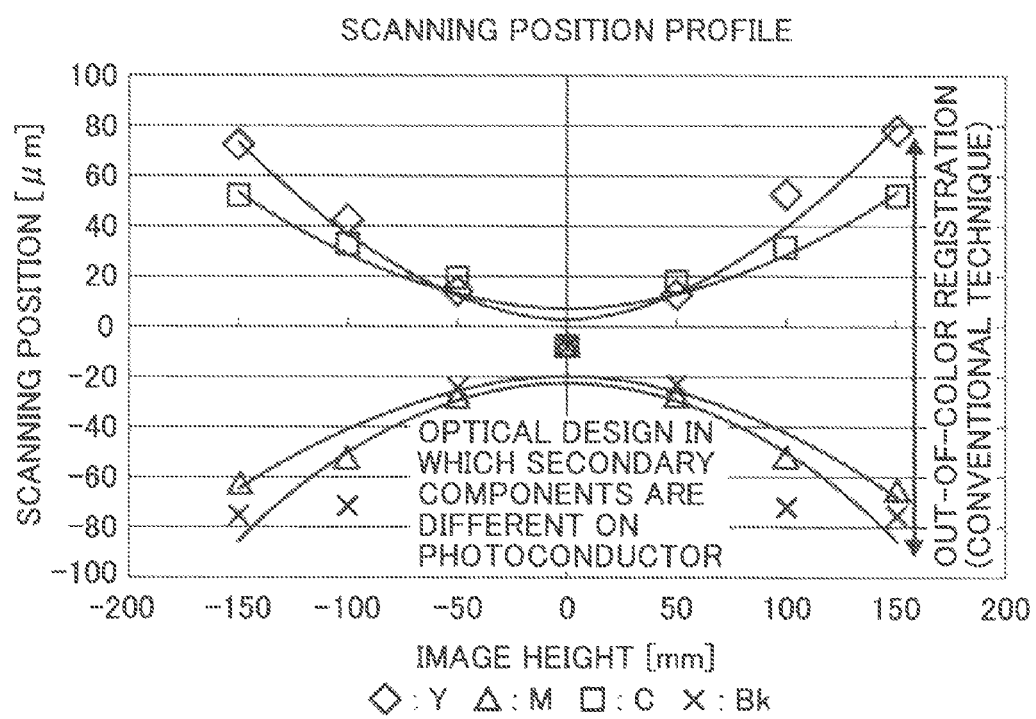
FIG. 13A is a graph of a scanning line curvature and out-of-color registration according to a conventional technique, in which optical design is made such that secondary components of four colors (Y, C, M, Bk) are different from each other on a photoconductor.

A scanning line curvature in the conventional technique in which optical design is made such that the secondary components of the four colors (Y, C, M, Bk) are made different on the photoconductors is shown in FIG. 13A. This indicates that, for example, even if the optical scanning apparatus in the color image forming apparatus in which the four first plastic lenses (scanning lenses) in all the f-theta lens optical systems have the same curvature is used, if the layout on the optical design is such that the number of the folding mirrors in each f-theta lens optical system is different, out-of-color registration as shown in FIG. 13A appears noticeably.

Figure 13B:
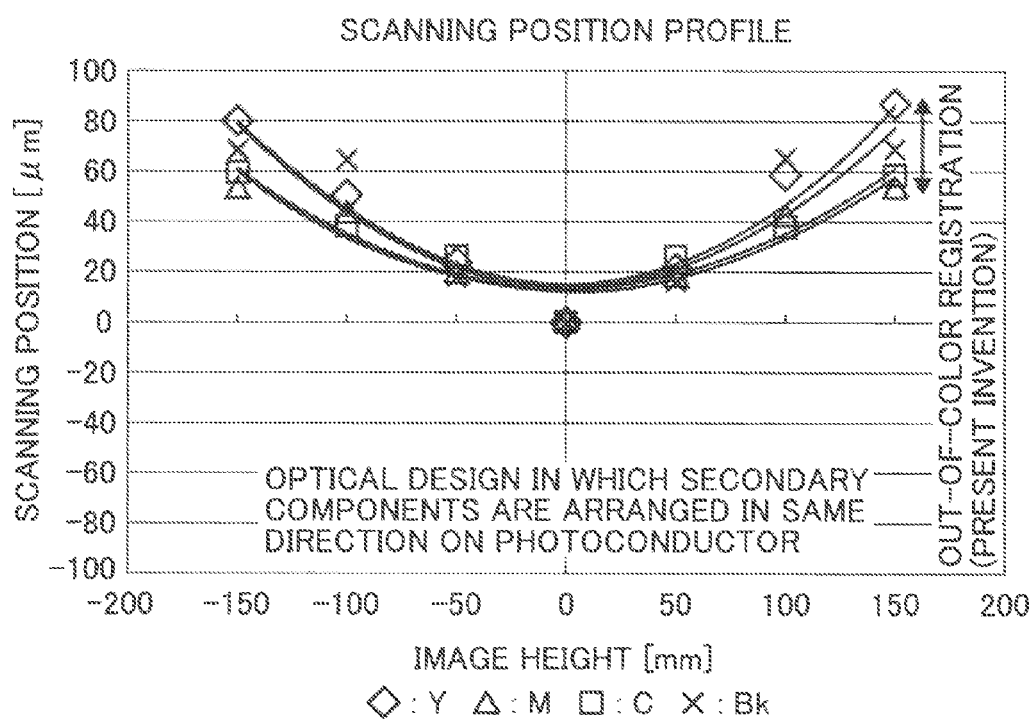
FIG. 13B is a graph of a scanning line curvature and out-of-color registration according to the embodiments.

As shown in FIG. 13B, prevention of out-of-color registration can be considerably improved by adopting the configuration unique to the present invention explained in the first to eighth embodiments, in other words, a specific configuration satisfying the two conditions, that is, the directions of the four colors are equalized in the optical design (mathematically, the secondary components are extracted), and directions of outline curvatures that affect a scanning line curvature due to the plastic lens are made the same direction.

As explained above, in the first to eighth embodiments, a scanning-line-change correcting method for correcting a change in the scanning line, when optical beams emitted from a plurality of light source units are imaged on a single or a plurality of deflecting units, and the optical beams deflected by the deflecting units are imaged and scanned on a plurality of corresponding surfaces to be scanned via an imaging optical system having at least one or more plastic lenses, is used. In the scanning-line-change correcting method, at least one or more plastic lenses in each imaging optical system are formed such that secondary components at scanning positions on the surfaces to be scanned are arranged in the same direction, and the change in the scanning line is corrected by using a plastic lens having the same shape, including use of at least one molded by the same mold cavity, as the at least one or more plastic lenses.

While representative embodiments of the present invention have been explained above, the scope of the inventive concept disclosed by the invention is not limited to the embodiments. Accordingly, as will be understood by those skilled in the art, these embodiments can be appropriately combined with each other, and various other embodiments and modifications can be made without departing from the scope of the present invention according to needs and applications.

A novel optical scanning apparatus, image forming apparatus, and scanning-line-change correcting method can be provided by solving the above problems. Major effects of the present invention are as follows.

According to the present invention, scanning line deviation of the optical scanning apparatus can be prevented by a simple configuration, without considerably increasing the accuracy of the plastic lens, that is, a color image forming apparatus and an optical scanning apparatus that can reduce out-of-color registration can be provided.

According to the present invention, scanning line deviation of the optical scanning apparatus can be prevented by a simple scanning-line-change correcting method, without considerably increasing the accuracy of the plastic lens, that is, a simple scanning-line-change correcting method capable of reducing out-of-color registration can be provided.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning apparatus comprising a plurality of imaging optical systems formed of at least one or more plastic lenses, in which optical beams emitted from a plurality of light source units are imaged on a single deflecting unit, and the optical beams deflected by the deflecting unit are imaged and scanned on a plurality of corresponding surfaces to be scanned via the respective imaging optical systems, wherein:
the at least one or more plastic lenses constituting each imaging optical system are arranged on opposite sides of the deflecting unit, so that main scanning directions of the optical beams scanned by the deflecting unit become substantially parallel to each other, and the at least one or more plastic lenses in the imaging optical systems are molded by a same mold cavity;
each imaging optical system has at least one or more folding mirrors;
a number of the folding mirrors that fold back the optical beams having passed through the at least one or more plastic lenses is the same for each plastic lens; and
the at least one or more plastic lenses include a non-transfer surface.

2. The optical scanning apparatus according to claim 1, wherein the at least one or more plastic lenses constituting the imaging optical system are laminated in a sub-scanning direction orthogonal to the main scanning direction.

3. The optical scanning apparatus according to claim 1, wherein the at least one or more plastic lenses constituting the imaging optical system are integrally formed in the sub-scanning direction orthogonal to the main scanning direction.

4. The optical scanning apparatus according to claim 1, wherein the optical beams are generated by a multi-semiconductor laser.

5. The optical scanning apparatus according to claim 1, wherein
each imaging optical system has at least two plastic lenses, and
a combination of the at least two plastic lenses is defined.

6. The optical scanning apparatus according to claim 1, wherein
each imaging optical system has at least two plastic lenses, and
the at least two plastic lenses can be identified.

7. The optical scanning apparatus according to claim 1, wherein a part of the plastic lens has a non-transfer surface.

8. An image forming apparatus that forms an electrostatic latent image on a plurality of image carriers by an optical scanning apparatus, develops the electrostatic latent image with a color toner different for each image carrier, and sequentially superposes and transfers the toner images formed on respective image carriers onto an intermediate transfer body, and thereafter, batch-transfers the toner images on a sheet-like recording medium, thereby obtaining a color image, wherein
the optical scanning apparatus is the optical scanning apparatus according to claim 1.

9. An optical scanning apparatus comprising a plurality of imaging optical systems formed of at least two plastic lenses, in which optical beams emitted from a plurality of light source units are imaged on a single deflecting unit, and the optical beams deflected by the deflecting unit are imaged and scanned on a plurality of corresponding surfaces to be scanned via the respective imaging optical systems, wherein:
a lens arranged closest to the deflecting unit of the at least two plastic lenses constituting the imaging optical system is a common lens corresponding to the surfaces to be scanned;
the at least one or more plastic lenses in the imaging optical systems are molded by a same mold cavity;
each imaging optical system has at least one or more folding mirrors;
a number of the folding mirrors that fold back the optical beams having passed through the at least one or more plastic lenses is the same for each plastic lens; and
the at least one or more plastic lenses include a non-transfer surface.

10. The optical scanning apparatus according to claim 9, wherein the optical beams are generated by a multi-semiconductor laser.

11. The optical scanning apparatus according to claim 9, wherein
  each imaging optical system has at least two plastic lenses, and
  a combination of the at least two plastic lenses is defined.

12. The optical scanning apparatus according to claim 9, wherein each imaging optical system has at least two plastic lenses, and the at least two plastic lenses can be identified.

13. The optical scanning apparatus according to claim 9, wherein a part of the plastic lens has a non-transfer surface.

14. An image forming apparatus that forms an electrostatic latent image on a plurality of image carriers by an optical scanning apparatus, develops the electrostatic latent image with a color toner different for each image carrier, and sequentially superposes and transfers the toner images formed on respective image carriers onto an intermediate transfer body, and thereafter, batch-transfers the toner images on a sheet-like recording medium, thereby obtaining a color image, wherein
  the optical scanning apparatus is the optical scanning apparatus according to claim 9.

15. An optical scanning apparatus comprising a plurality of imaging optical systems formed of at least one or more plastic lenses, in which optical beams emitted from a plurality of light source units are imaged on a plurality of deflecting units, and the optical beams deflected by the respective deflecting units are imaged and scanned on a plurality of corresponding surfaces to be scanned via the respective imaging optical systems, wherein:
  the at least one or more plastic lenses in the imaging optical systems are molded by a same mold cavity;
  each imaging optical system has at least one or more folding mirrors;
  a number of the folding mirrors that fold back the optical beams having passed through the at least one or more plastic lenses is the same for each plastic lens; and
  the at least one or more plastic lenses include a non-transfer surface.

16. The optical scanning apparatus according to claim 15, wherein the at least one or more plastic lenses constituting the imaging optical system are laminated in a sub-scanning direction orthogonal to the main scanning direction.

17. The optical scanning apparatus according to claim 15, wherein the optical beams are generated by a multi-semiconductor laser.

18. The optical scanning apparatus according to claim 15, wherein
  each imaging optical system has at least two plastic lenses, and
  a combination of the at least two plastic lenses is defined.

19. The optical scanning apparatus according to claim 15, wherein
  each imaging optical system has at least two plastic lenses, and
  the at least two plastic lenses can be identified.

20. The optical scanning apparatus according to claim 15, wherein a part of the plastic lens has a non-transfer surface.

21. An image forming apparatus that forms an electrostatic latent image on a plurality of image carriers by an optical scanning apparatus, develops the electrostatic latent image with a color toner different for each image carrier, and sequentially superposes and transfers the toner images formed on respective image carriers onto an intermediate transfer body, and thereafter, batch-transfers the toner images on a sheet-like recording medium, thereby obtaining a color image, wherein
  the optical scanning apparatus is the optical scanning apparatus according to claim 15.

\* \* \* \* \*